United States Patent [19]

LeBlanc

[11] Patent Number: 5,387,081
[45] Date of Patent: Feb. 7, 1995

[54] COMPRESSOR DIFFUSER

[75] Inventor: Andre D. LeBlanc, St. Bruno, Canada, J3V 4P3

[73] Assignee: Pratt & Whitney Canada, Inc., Quebec, Canada

[21] Appl. No.: 164,339

[22] Filed: Dec. 9, 1993

[51] Int. Cl.6 ............................................. F04D 29/44
[52] U.S. Cl. ................................ 415/208.1; 415/208.3
[58] Field of Search ............... 415/208.1, 208.2, 208.3, 415/224.5

[56] References Cited

U.S. PATENT DOCUMENTS

| | | | |
|---|---|---|---|
| 3,333,762 | 8/1967 | Vrana | 415/224.5 |
| 3,604,818 | 9/1971 | Cronstedt | 415/208.3 |
| 3,860,360 | 1/1975 | Yu | 415/208.3 |
| 3,876,328 | 4/1975 | Exley | 415/208.3 |
| 4,302,150 | 11/1981 | Wieland | 415/208.3 |
| 4,455,121 | 6/1984 | Jen | 415/224.5 |
| 5,143,514 | 9/1992 | Adachi | 415/150 |
| 5,145,317 | 9/1992 | Brasz | 415/208.2 |
| 5,165,226 | 11/1992 | Newton et al. | 60/39.36 |

FOREIGN PATENT DOCUMENTS 191066  9/1956  Austria ........................... 415/208.3

Primary Examiner—John T. Kwon
Attorney, Agent, or Firm—Edward L. Kochey, Jr.

[57] ABSTRACT

Compressor 14 of a gas turbine engine has a final centrifugal stage 18 discharging air into annulus 20. Diffuser 20 are straight and of frustoconical shape receiving air from the annulus. A side cut produces opening 38 in the side of each diffuser. Much of the flow exits through, and is directed by these openings.

23 Claims, 3 Drawing Sheets

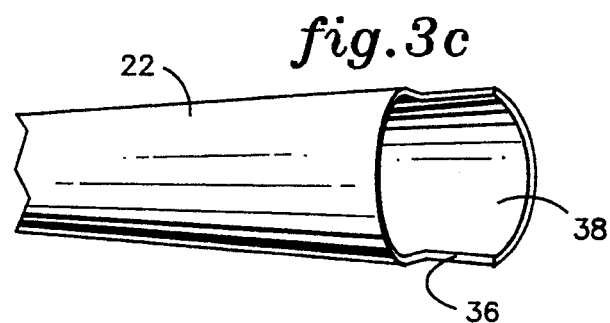
fig. 3c
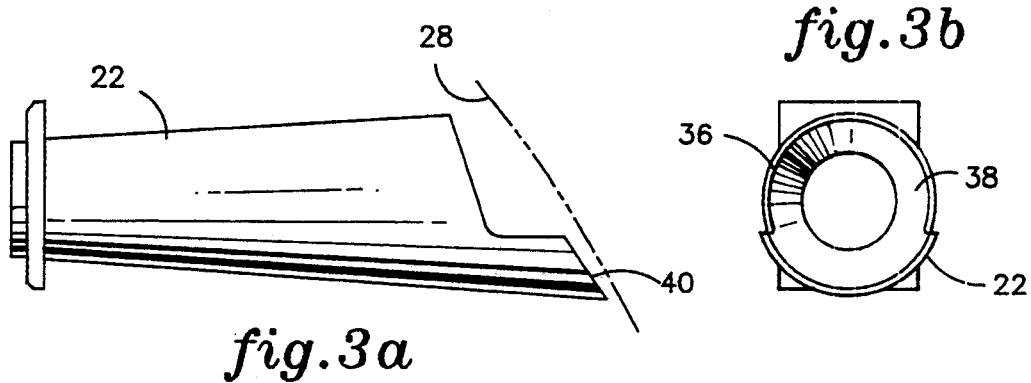
fig. 3b
fig. 3a
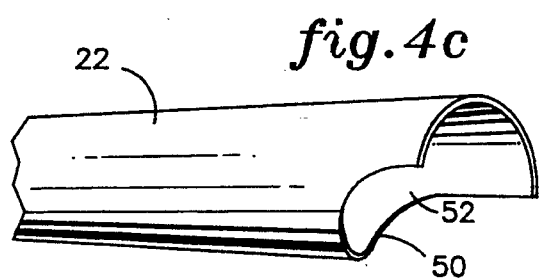
fig. 4c
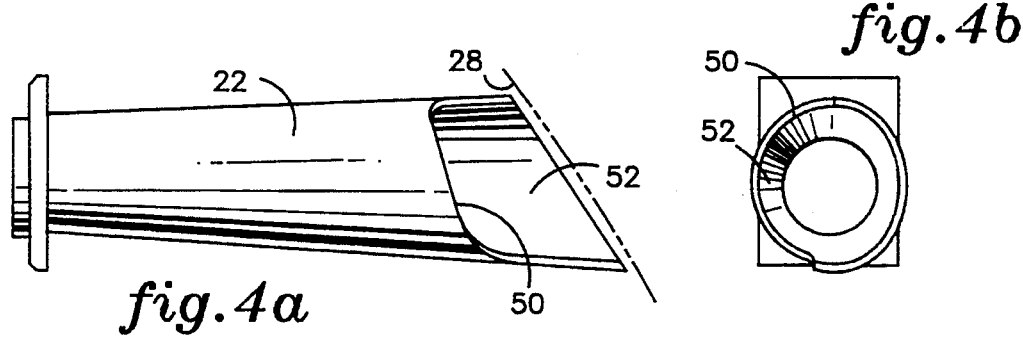
fig. 4b
fig. 4a

COMPRESSOR DIFFUSER

TECHNICAL FIELD

The invention relates to air compressor discharge and in particular to the discharge from a centrifugal stage to a confined volume of a gas turbine engine.

BACKGROUND OF THE INVENTION

The gas turbine engine air must be compressed before it's use in the combustor. The compressor may be either axial, centrifugal, or a combination of the two.

In certain engines axial stages are followed by a centrifugal final stage. Such an arrangement is shown in U.S. Pat. No. 5,165,226 along with delivery of the compressed air to the combustor.

Air leaving the centrifugal stage is at a high velocity traveling with a major tangential velocity component. This velocity passing into the annulus surrounding the centrifugal stage must be transformed to pressure energy, and the air delivered to the combustor with minimum pressure loss. The intense swirl must also be reduced. The swirl continues abated somewhat into the combustor, passing through the side wall cooling openings. Some swirl facilitates mixing, while a high swirl creates ignition stability problems in the combustor.

It's desirable that a aircraft gas turbine engine be as small as possible both as to length and diameter. Therefore the conversion of velocity energy to pressure energy must be accomplished in a minimum volume.

Conventional practice uses a bent trumpet diffuser to transform this high velocity air. The trumpet receives air tangentially from the compressor discharge annulus and expands the flow area. This reduces the velocity and velocity head of the airflow. The trumpet then bends toward the combustion supply volume while still expanding the flow area.

The reduction of velocity before the turn is used to reduce the loss during the turn. Secondary flow in the form of twin circular paths occurs during the turn, resulting in some increased pressure drop in the remainder of the trumpet. Attempts to minimize this loss puts further constraints on the freedom to further shape the trumpet. The additional increased flow area after the bend is an attempt to reduce the exit loss.

Straightening vanes have been placed near the exit of the trumpet to reduce the swirl in the chamber. These have been only partially successful and also introduce further pressure loss.

SUMMARY OF THE INVENTION

A gas turbine engine has a combustor and a confining case defining an air supply volume which communicates with the combustor. A centrifugal air compressor supplying air to the supply volume has a centrifugal final stage and the annulus, receiving air from the final stage. A plurality of diffusers receive air tangentially extending toward the case.

Each of the diffusers is straight and of a truncated conical shape with an apex end and a base end. The base end is open establishing a base flow area and is spaced slightly from the case. A side cut contiguous with the base end opening removes a portion of the conical diffuser. This side cut produces a side flow area which is at least equal to the base flow area.

The increasing flow area of the conical shape decreases the velocity resulting in a lower velocity head at the exit. The exit loss is combined with a turning loss of a portion of the flow rather than having a loss in a bend in addition to the exit loss. The amount of increase in flow area with respect to length is not limited by considerations of increased pressure drop in any subsequent bend. The slight clearance between the base end of the diffuser and the case permits a portion of the flow to continue to the end of the diffuser, thereby avoiding separation prior to the side cut exit and the concomitant pressure loss.

BRIEF DESCRIPTION OF THE DRAWINGS

FIGS. 3a, b and c are details of a diffuser; and

FIGS. 4a, b, c are details of a diffuser having an opening which is facing substantially parallel to the gas turbine engine axis.

DESCRIPTION OF THE PREFERRED EMBODIMENT

Figure 1:
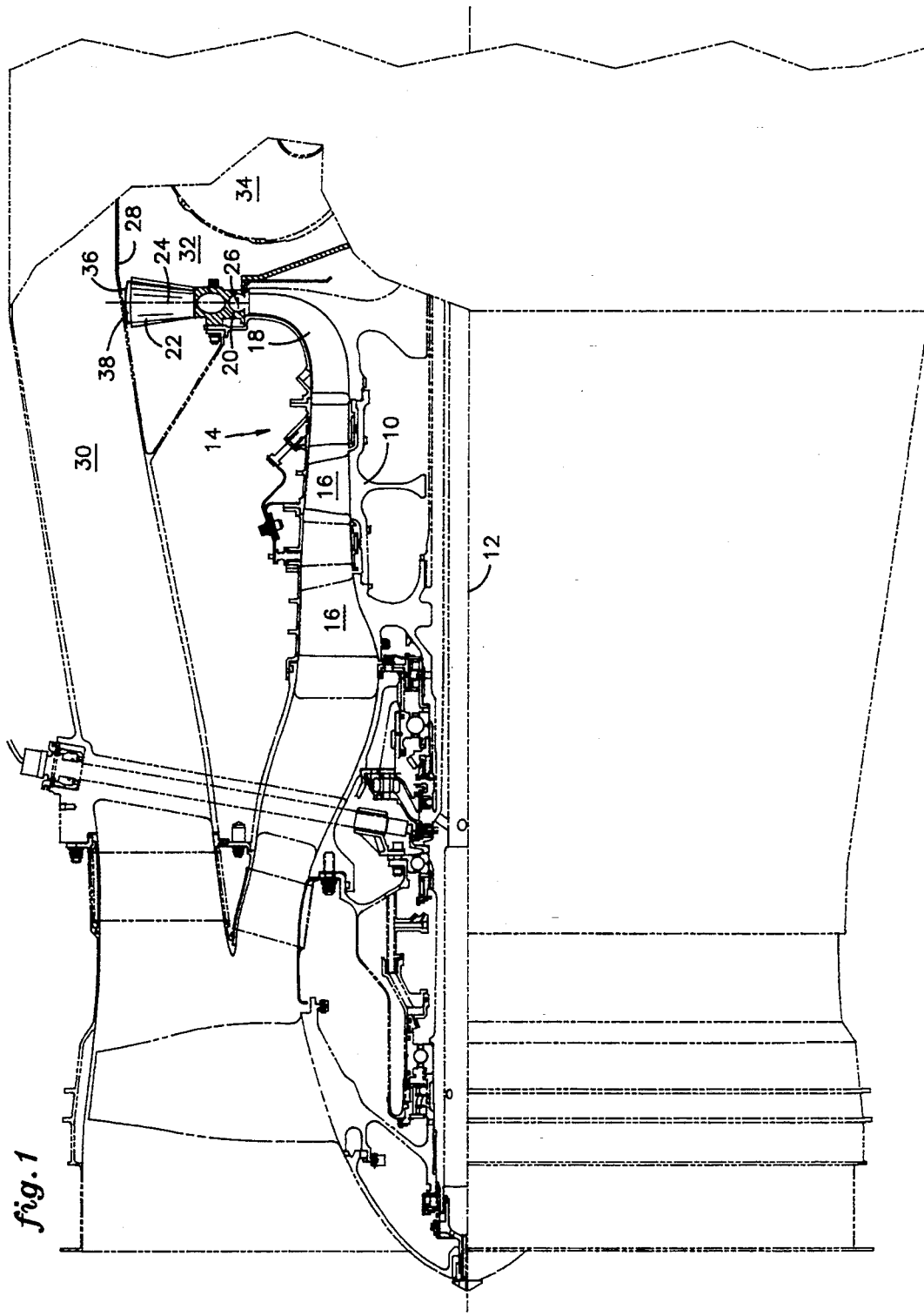
FIG. 1 is a sectional side view of a portion of a gas turbine engine.

FIG. 1 shows a rotor 10 of a gas turbine engine having a longitudinally extending axis 12. Compressor 14 has axial stages 16 followed by a final centrifugal stage 18. Compressed air from this stage passes into annulus 20 with an extremely high tangential velocity.

A plurality of diffusers 22 receive air from the annulus and extend outwardly with the centerline 24 of each diffuser substantially tangent to the centerline 26 of annulus 20.

Each diffuser is frustoconical in shape with an apex end toward the annulus 20 and a base end near case 28. This case is the inner boundary of bypass duct 30 and defines a volume 32 surrounding and in fluid communication with combustor 34.

Figure 2:
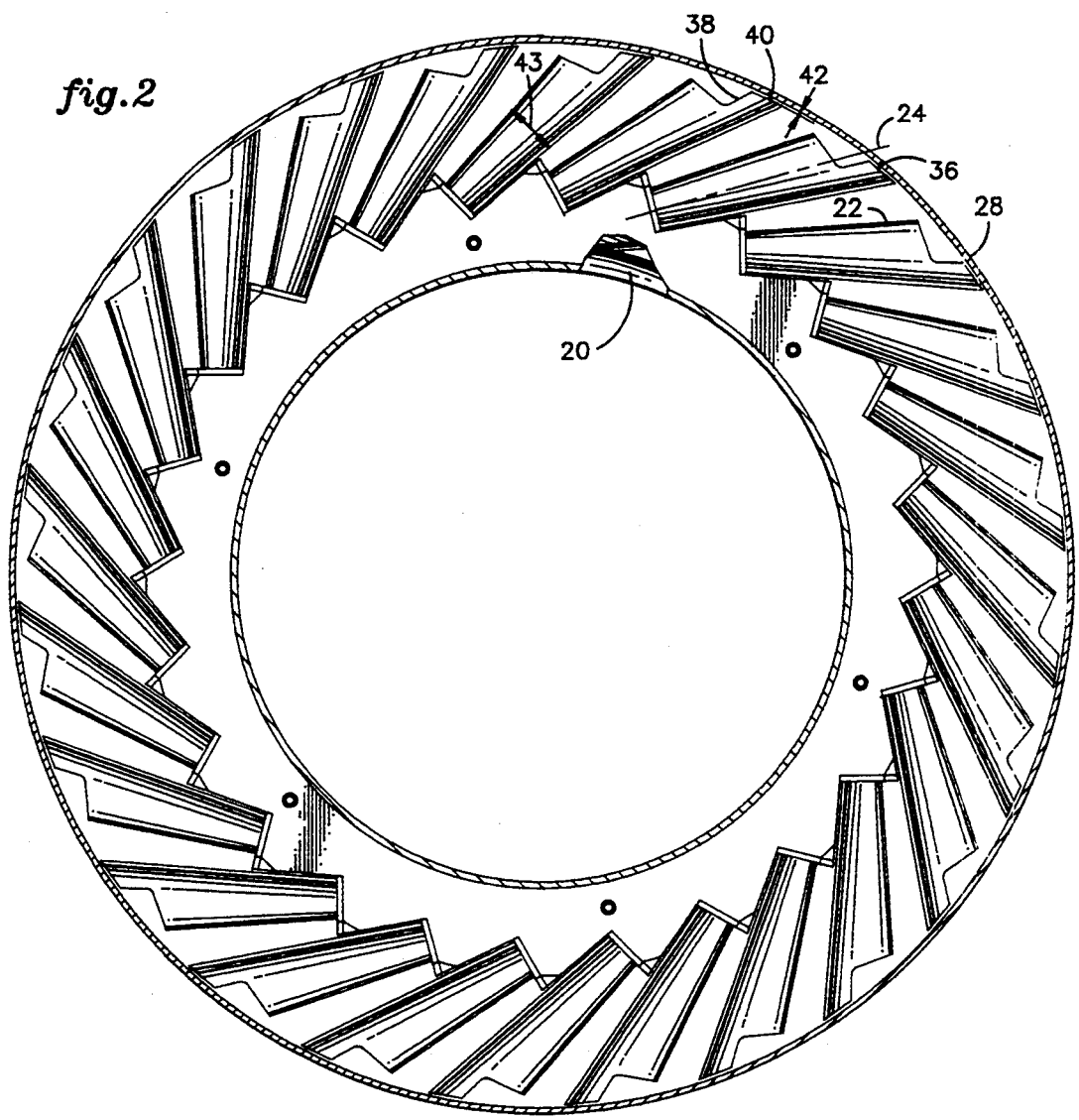
FIG. 2 is a rear section showing the arrangement of diffusers in the gas turbine engine.

The base end 36 of each diffuser is open and in the embodiment shown here the side cut produces opening 38 which is facing in the plane of the diffusers 22. As best seen in FIG. 2 the end 40 of the base end 36 of each diffuser has a clearance 42 from case 28. This clearance is preferably between 0.08 inches and 0.10 inches.

Each diffuser 22 has opposing sides diverging with an angle 43 between the side walls. This angle may be as low as 6° and as much as 15° to obtain the required exit velocity. The high velocity fluid passing into the diffusers from annulus 20 is decreased in velocity as it passes through each diffuser. The greater the angle of divergence, the greater the decrease in velocity will be for a given diffuser length. Too great an angle of divergents however will result in separation from the walls which is not desirable. It is believed however that the relatively close restriction at the outlet will tend to permit a greater divergence than normally the case in a conventional trumpet.

The flow area of opening 38 of each trumpet faces in the plane of the plurality of diffusers in a direction opposite the rotation of the air. This total flow area cut from the circumference from each of the diffuser is about 1½ times the flow area of the base of the diffuser. A major portion of the flow passes through the side opening with the orientation of the side opening affecting the rotation of the air after it leaves the diffuser. The exit pressure loss is only the exit loss of the turning portion operating in parallel with the flow through the restriction between the base of the diffuser and the case. This was found to be less than the pressure drop in the prior art diffusers investigated, and results in an increased pressure recovery. FIG. 3a, b and c is a view of diffuser 22 showing its relation to case 28. It is noted that it is not necessary for the end 40 to be curved so that it conforms to the circular shape of casing 28, but over the short distance a straight base may be used if desired. The relationship of side opening 38 with respect to the diffuser is also illustrated in these figures.

Since the cut at the base end of each diffuser is not perpendicular to the centerline, an ellipse will be produced. If the side cut is too deep, air will be discharged before the velocity is reduced. Therefore the cut should not extend from the base end a distance greater than the minor diameter of the base end.

FIG. 4a, b and c illustrates a similar diffuser 22 but with the side cut 50 producing a flow area 52 which is facing substantially parallel to the gas turbine axis 12 which is also substantially perpendicular to the plane of the diffusers. With such an arrangement there would be substantially less reduction in this swirl. The open face of the cut may be oriented at desired locations between the two illustrated with the purpose of achieving a desired rotation of velocity in chamber 32.

The opening has been shown facing parallel to the axis of the compressor, and also facing in the plane of the plurality of diffusers. It may face between these two directions, but preferably should not be greater than, or less than these two extremes.

The diffusers reduce the velocity and swirl of the flow exiting from the centrifugal compressor while maximizing the static pressure rise. This is accomplished with less pressure loss than with prior designs.

I claim:
1. In a gas turbine engine having a combustor;
 a confining case defining an annular air supply volume communicating with said combustor;
 a centrifugal air compressor supplying air to said supply volume, having a centrifugal final stage and an annulus receiving air from said final stage;
 a plurality of diffusers receiving air tangentially from said annulus, and extending tangentially toward said case;
 the improvement comprising:
 each diffuser of truncated conical shape having an apex end and a base end;
 said base end spaced from said case and open, establishing a base flow area; and
 a side cut removing a portion of said conical diffuser contiguous with said base end, said side cut producing a side flow area at least equal to said base flow area.
2. A gas turbine engine as in claim 1 further comprising:
 said side cut opening facing parallel to the axis of said compressor.
3. A gas turbine engine as in claim 2 further comprising:
 said base end of said diffusers spaced from said case a distance between 0.08 inches and 0.10 inches.
4. A gas turbine engine as in claim 3 further comprising:
 the angle between opposing walls of each diffuser being between 6° and 15°.
5. A gas turbine engine as in claim 4 further comprising:
 said side cut producing a side flow area at least equal to 1.5 times said base area.
6. A gas turbine engine as in claim 5 further comprising:
 said side cut extending from said base end less than the minor diameter of said base end.
7. A gas turbine engine as in claim 1 further comprising:
 said side cut opening facing in the plane of said plurality of diffusers.
8. A gas turbine engine as in claim 7 further comprising:
 said base end of said diffusers spaced from said case a distance between 0.08 inches and 0.10 inches.
9. A gas turbine engine as In claim 8 further comprising:
 the angle between opposing walls of each diffuser being between 6° and 15°.
10. A gas turbine engine as in claim 9 further comprising:
 said side cut producing a side flow area at least equal to 1.5 times said base area.
11. A gas turbine engine as in claim 10 further comprising:
 said side cut extending from said base end less than the minor diameter of said base end.
12. A gas turbine engine as in claim 1 further comprising:
 said base end of said diffusers spaced from said case a distance between 0.08 inches and 0.10 inches.
13. A gas turbine engine as in claim 12 further comprising:
 the angle between opposing walls of each diffuser being between 6° and 15°.
14. A gas turbine engine as in claim 13 further comprising:
 said side cut producing a side flow area at least equal to 1.5 times said base area.
15. A gas turbine engine as in claim 14 further comprising:
 said side cut extending from said base end less than the minor diameter of said base end.
16. A gas turbine engine as in claim 1 further comprising:
 the angle between opposing walls of each diffuser being between 6° and 15°.
17. A gas turbine engine as in claim 1 further comprising:
 said side cut producing a side flow area at least equal to 1.5 times said base area.
18. A gas turbine engine as in claim 1 further comprising:
 said side cut extending from said base end less than the minor diameter than said base end.
19. A gas turbine engine as in claim 1 further comprising:
 said side cut opening facing not greater than parallel to the axis of said compressor, and facing not less than in the plane of said plurality of diffusers.
20. A gas turbine engine as in claim 19 further comprising:
 said base end of said diffusers spaced from said case a distance between 0.08 inches and 0.10 inches.
21. A gas turbine engine as in claim 20 further comprising:
 the angle between opposing walls of each diffuser being between 6° and 15°.
22. A gas turbine engine as in claim 21 further comprising:
 said side cut producing a side flow area at least equal to 1.5 times said base area.
23. A gas turbine engine as in claim 22 further comprising:
 said side cut extending from said base end less than the minor diameter of said base end.

* * * * *